Nov. 1, 1938.       R. B. EVERSON       2,135,302
GAS MEASURING AND DISPENSING APPARATUS
Original Filed Oct. 11, 1934
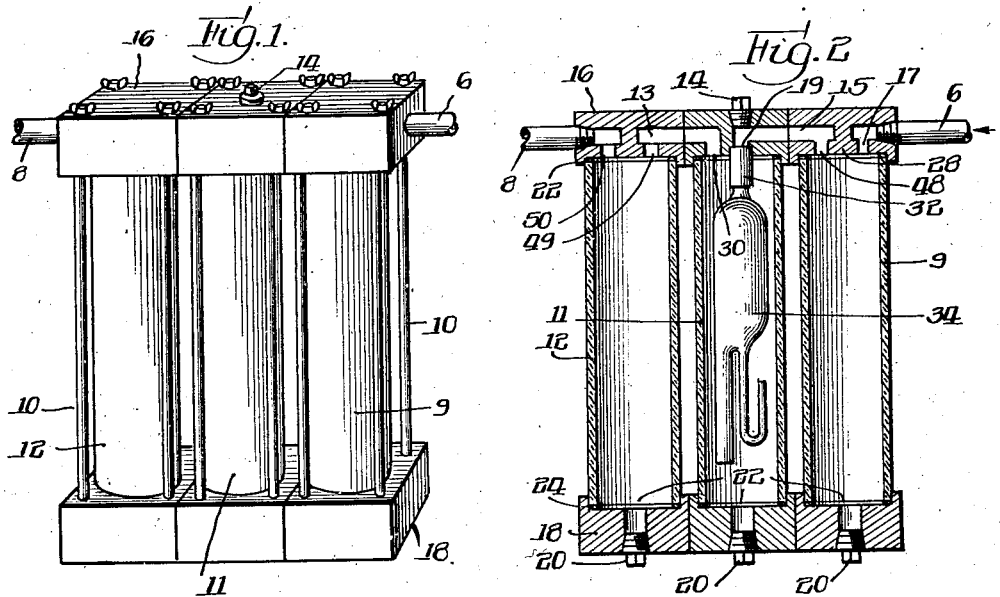
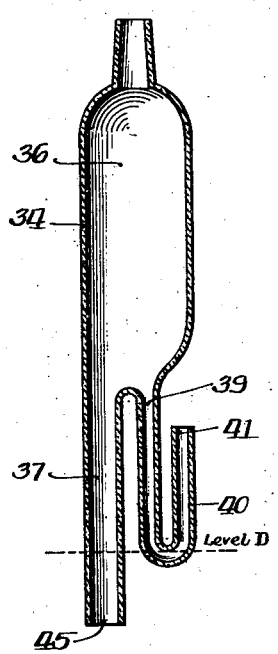
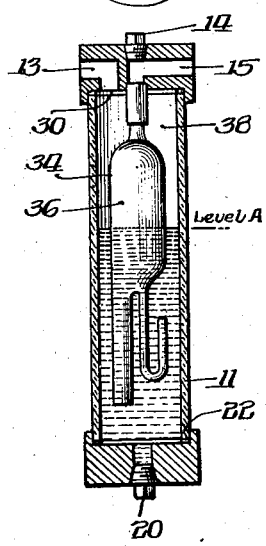
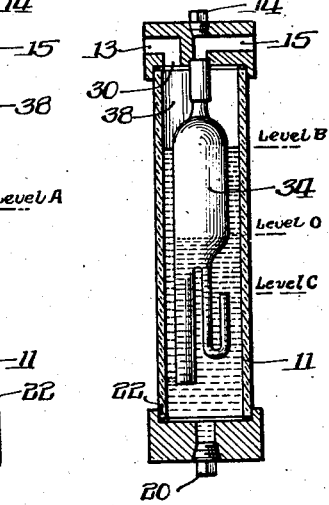
Inventor:
Roy Blair Everson
By:- Cox & Moore
attys.

Patented Nov. 1, 1938

2,135,302

UNITED STATES PATENT OFFICE 2,135,302

GAS MEASURING AND DISPENSING APPARATUS

Roy Blair Everson, Chicago, Ill.

Application October 11, 1934, Serial No. 747,815
Renewed June 18, 1937

8 Claims. (Cl. 73—194)

This invention relates to an improvement in an apparatus for dispensing chlorine or other commercially used gases.

It is an object of the present invention to provide a means whereby chlorine or other gases may be delivered in measured quantities for liquid absorption.

It is another object of the present invention to provide a means for delivering a measured quantity of chlorine or other commercially used gases in a continuous metered flow.

It is another object of the present invention to provide a means for delivering gases for absorption capable of being operated in either direction, namely, capable of permitting a flow of gas from one set of openings or ports through the device to another set of openings or ports, or conversely, for permitting flow from the last-named set of openings or ports through the device to the first-named openings or ports.

It is another object of the present invention to provide means for delivering gases to be used absorptively in measured quantities, permitting bi-lateral operation, and yet preventing a return of absorbing liquid through the device.

Another object of the present invention is to provide means for delivering a measured supply of absorbable gas in such a manner as to prevent any drawing back of the absorbing liquid through the means.

Other objects and advantages will become apparent from the following specification.

In the accompanying drawing is shown a preferred embodiment of this invention, as follows:

Fig. 1 is a perspective view of a preferred form of the apparatus.

Fig. 2 is a cross-section of a preferred form of the apparatus shown in Fig. 1.

Fig. 3 is a cross-sectional view of the metering or "bubbler" device.

Fig. 4 is a cross-sectional view of the control chamber of the preferred embodiment shown in Fig. 1, showing the levels of liquid in the device under normal non-operating conditions.

Fig. 5 is a cross-section of the chamber showing levels of the liquid therein at one period of the operating cycle.

The preferred embodiment of this invention shown in the drawing comprises three open-ended glass cylinders 9, 11 and 12, mounted between two preferably chemically inert blocks 16 and 18, each of said blocks having three corresponding circular recesses such as shown at 24 into which the glass cylinders fit as shown, said recesses being fitted with soft rubber ring washers 22, the block 16 being drawn toward the block 18 by means of the threaded rods 10 passing between the said blocks and fitted preferably with wing nuts. The top block 16 is provided with interior passageways or ducts preferably as shown in Fig. 2 at 15 and 13, corresponding opposite ends being also preferably threaded to receive the entrance conduit or tube 6 and the exit or outlet tube 8. Block 16 is also provided with a centrally located clean-out plug 14 preferably located as shown in Fig. 2, to allow for direct communication with the vertical passageway of duct 19, which communicates through tube 32 to the "bubbler" device 34. The block 18 is provided with three preferably symmetrically arranged clean-out plugs 20. It should be noted that the cubic contents of the member 36 should be substantially greater than the volume of sealing liquid in the outer chamber.

In operation, gas enters through the tube 6 into passageway 15, flowing through the downwardly extending openings 17 and 19 in the block at the top of the glass cylinder 9, filling the glass cylinder 9, and at the same time filling the "bubbler" or metering device 34. The middle glass cylinder 11 is filled with a liquid. If the pressure on the inside of the "bubbler" mechanism and the pressure on the outside of the "bubbler" mechanism within the cylinder 11 are equal before the gas is turned on through tube 6, the liquid inside and outside the "bubbler" will be at the same level, (called level A in Fig. 4). When the gas enters the "bubbler", the pressure of the incoming gas forces the liquid down through the "bubbler", and out into the cylinder 11 through the two downwardly extending tubes 37 and 40, which form the lower portion of the "bubbler". At this stage in the operation the liquid is flowing out of the "bubbler" through the opening 45 in the vertical tube 37, and at the same time flowing out through the U-tube 40. As soon as the level of the liquid in the U-tube has reached the lower extremity of the arm 39 of the U-tube 40, the counter-balancing pressure exerted by the liquid through the upwardly extending arm 41 of the U-tube 40 becomes ineffective to prevent the efflux of the gas from the "bubbler" mechanism. Meanwhile, the level of the liquid moving down in the vertical tube 37 has reached a point parallel with the level of the bottom of the U-tube 40. This level is indicated in Fig. 3 as level D. At this point, the back pressure of the liquid, having been rendered ineffective as above described, the gas flows freely out through the downwardly extending arm 39 of the U-tube 40 and bubbles up through the upward extending arm 41 of the U-tube 40 through the liquid in the cylinder 11 to the free space 38 above the liquid level in the cylinder 11, and thence out through the vertical passage 30 into the horizontal tube 13 into the duct or tube 8, and thence to the place of use. At the same time, this outflowing gas enters the cylinder 12 through the passage 40, filling it with gas.

For purposes of describing the operation of the bubbler in the central chamber 11, it may be convenient to refer to certain levels as levels A, B, C, D and O respectively, as shown in the drawing in Figures 3, 4 and 5 respectively. For purposes of more specific description in this specification, it should be pointed out that level A represents the normal level of the sealing liquid in the bubbler meter when the pressures on the chamber 36 and the pressures in the chamber 38 are equal. Level B and level O are arbitrary intermediate levels when the pressures in the chambers 38 and 36 respectively are different, level B being the level in the chamber 38 under such conditions and level O being the level in chamber 36 under such conditions. Level C is the level at the exterior mouth of the U-tube 40. Level D is the level at the upper portion of the bend in the U-tube, level D obviously being below level C.

The "bubbler" in the central chamber 11 operates in the above described manner by taking advantage of differences in hydraulic pressure as follows:

As soon as the incoming gas by reason of its pressure begins to force the level of the liquid inside of the "bubbler" downwardly from level A, there is a liquid back-pressure exerted against the downward impulse of the gas equal to the difference between the level of the liquid inside the "bubbler" and the level outside the "bubbler". Thus, in overcoming this hydraulic back-pressure, the gas inside the "bubbler" tends to build up an overcoming pressure. At any instant, of course, the hydrostatic head represented by the difference between levels of the liquid inside the "bubbler" and the level of the liquid outside the "bubbler" is equal and opposite to the pressure of the incoming gas on the inside of the "bubbler." As the liquid in the "bubbler" moves down into the two tubes 37 and 40, the levels in these tubes will continue to correspond until the level D is reached. At this point, the hydrostatic head which is equilibrating the pressure of the incoming gas, will be represented by the difference between the level of the liquid outside the "bubbler" and the level of the liquid in the tube 37 (which is now at level D). At this instant, the same condition prevails in the U-tube 40. Since the gas continues to enter the "bubbler", the level in the tube 37 tends to drop somewhat below level D, but as this occurs, the liquid in the U-tube passes the bend therein and becomes merely a column of liquid in the upwardly extending arm 41 with gas pressure supporting it. Ordinarily, gas will bubble up through a liquid when it is beneath the liquid, but in the case of columns of liquid in tubes of small diameter, surface tension prevents this, whereby, the gas-liquid boundary line is unbroken. The U-tube 40 is, therefore, a capillary tube. The downward hydrostatic pressure, however, on this boundary line is equal to the difference between the level outside the "bubbler", and the level of this boundary line in the upwardly extending arm of the arm 41. Since the boundary line moves upward as the gas pressure increases in the "bubbler", this hydrostatic pressure in the arm 41 decreases. Thus, for a few instants of time, the level in the tube 37 is held at level D while the liquid in the arm 41 is being forced upward and out. As soon as the arm 41 is emptied, the gas begins to bubble out of the mouth 41. When this occurs, the gas pressure in the "bubbler" is released, and becomes less than the hydrostatic pressure in the tube 37, whereupon the level of the liquid in the tube 37 moves upward again. During this upward course, the gas pressure at any instant is equal and opposite to the hydrostatic head exerted upwardly in the tube 37, and thus it will be seen that until level C is reached, gas will continue to flow out of the mouth of the arm 41. When the level C is reached, however, the gas pressure is not only equal to the hydrostatic pressure exerted upwardly in the tube, but also is now just equal to the hydrostatic pressure at the mouth of the arm 41. Ordinarily, this equivalent of pressure at the mouth of the arm 41 would set up an equilibrium, and the flow of gas would stop. There is, however, a certain inertia to the column of liquid moving upward in the tube 37, which drives this liquid past the level C. In passing level C, the liquid in tube 37 tends to reduce the free volume in the whole "bubbler" at this instant, and thereby drives one last bubble of gas out of the mouth of the arm 41. Immediately, the force of this inertia is expended and the level of liquid in the tube 37 tends to drop back to the level C, which, of course, under the circumstances prevailing at this instant, is the hydrostatic normal for that liquid column. This dropping back creates a slight sucking back effect on the volume of gas now enclosed in the "bubbler", which tends to draw back a very slight amount of liquid through the mouth of the arm 41. As soon as this occurs, however, the level of liquid at the mouth of the arm 41 drops into the arm and consequently falls below the level C. When this happens, the hydrostatic pressure over the gas-liquid boundary line in the arm 41 becomes greater than the hydrostatic pressure at the level C, and similarly, becomes greater than the gas pressure which as above explained, is always equal and opposite to the hydrostatic pressure in the tube 37. Thus, the gas-liquid boundary line rapidly moves downward through the arm 41, rushing past the bend in the U-tube and passing upward through the arm 39, flooding into the lower portion of the chamber 36 in the gas "bubbler." This completes one bubbling cycle, and immediately the incoming gas pressure gains ascendancy again, and starts forcing the liquid in the "bubbler" downwardly into the tube 37 and the U-tube 40 as above described, repeating the cycle. On each complete bubbling cycle, a measured quantity of gas will be delivered, depending upon the size of the relative parts of the "bubbler." The rapidity with which these cycles take place may be varied by varying the pressure of the incoming gas.

When the apparatus is turned off after use, the gas in the chamber portions of the apparatus will tend to be absorbed in the liquid, whereupon a vacuum will tend to form inside the "bubbler" mechanism in the space 36. This vacuum effect will draw the liquid up into the "bubbler" mechanism, and tend to draw the liquid back into the tube 15, flooding the gas valve mechanism or any similar apparatus which may be used in conjunction therewith. This is a very undesirable effect, to overcome which, the cylinder 9 is employed in conjunction with the passage 15 and the opening 75

17 to permit the returning liquid if it returns in the line this far, to flow down into said cylinder 9. This cylinder 9, however, does not afford complete protection against the "backing-up" effect. In fact, this cylinder 9 is employed in conjunction with cylinder 12 as a protection chiefly against a different type of "backing-up" effect described below. The normal absorptive "backing-up" effect now being discussed, is overcome by the design of the "bubbler" mechanism itself. When the level of the liquid in the cylinder 11 moves down as the level of the liquid inside the "bubbler" mechanism moves upward due to the vacuum effect, it will eventually reach the level of the outer mouth of the upwardly extending leg 41 of the U-tube 40, whereupon this level will move down into the upwardly extending leg 41 of the U-tube 40 until it reaches the level D as shown in Fig. 3. At this point, the gas in the free space of the cylinder 11 will bubble back up through the downwardly extending leg 39 of the U-tub 40 and up through the liquid inside the "bubbler" mechanism into the free space 36, equalizing the pressure on the inside and outside of the "bubbler" mechanism respectively, whereupon, the vacuum will "break", and the liquid level fall back to the normal non-operating level A. If, after this "breaking" occurs, there is any further tendency for gas absorption on the inside of the "bubbler" mechanism, the above described sequence of events will reoccur until a successive "breaking" effect takes place, thus, continually preventing any drawing back of the liquid through the duct 19 into the passage 15 endangering the valve or gas supply mechanism.

This reverse operability of the "bubbler" has a further aspect. The "bubbler" can be employed as a metering device in this reverse manner by reversing the intake and outlet attachments. Under such circumstances, the inflowing gas enters the outer chamber 38, bubbles through into the inner chamber 36, and thence through passage 19. Where the diameter of the outer chamber is relatively large with respect to the diameter of the inner chamber, the "bubbler" upon reversal will deliver a greatly increased volume of gas at each pulsation or cycle. Thus, when so great a flow of gas is needed that the forward operating pulsations are too rapid for accurate metering, the capacity can be increased simply by reversing the operation of the "bubbler." This feature greatly increases the range and flexibility of the metering device itself as well as the whole apparatus with which it is being used.

There is another danger in the "turned-off" condition of such gas-dispensing mechanisms which is also overcome by my invention. The pipe or duct 8 ordinarily leads to some sort of absorbing mechanism, said absorbing mechanism usually containing an absorbing liquid. When the apparatus is shut down, this absorbing liquid tends to further absorb gas from the space above it, and from the gas-filled portion of the pipe 8, and create a vacuum similar to that described above in connection with the shut-down condition of the "bubbler" mechanism itself, whereupon there is a tendency to suck back this absorbing liquid through the pipe 8. Ordinarily, this absorbing liquid would tend to flood not only the metering apparatus, but also the gas supply mechanism. In my invention I have provided the glass cylinders 9 and 12 on either side of the "bubbler" mechanism, which cylinders are normally filled with gas. Thus, the vacuum created in the tube 8 will draw on the supply of gas in the cylinder 12, creating therein a slight vacuum, and also creating a slight vacuum in the passage 13. This vacuum effect will therefore reduce the pressure on the liquid level in the cylinder 11 outside the "bubbler" mechanism. Under such circumstances, the level of the liquid in the cylinder 11 outside the "bubbler" mechanism will tend to rise, the level inside the "bubbler" mechanism falling correspondingly, and an action substantially simiar to that above described in connection with the operating cycle of the "bubbling" mechanism will take place, and gas will bubble through the U-tube 40, being drawn from the free space 36 in the "bubbler" mechanism, and also being drawn through the duct 19 and the duct 15, and the opening 48 from the gas-filled chamber formed by the cylinder 9. Inasmuch as the volume of the cylinder 11 is comparatively much smaller than the volume of the absorbing apparatus, the level changes in this cylinder will be much more sensitive and rapid than the level changes in the absorbing mechanism, wherefore, this above described operation will much more readily ensue in preference to any drawing back of the absorbing liquid from the absorber. Furthermore, since this takes place under vacuum impulse, rather than the impulse of positive pressure, the action will be comparatively slow, and the gas contained in the reservoir chambers 12, and particularly 9, will be drawn upon to compensate for the absorption taking place in the absorbing mechanism and in the tube 8. Finally, there will tend to be a difference in pressure between the auxiliary chambers 9 and 12 so long as any vacuum continues to be set up in the line 8. This difference in pressure will cause bubbling and equalization through the "bubbler" until the gas in both chambers 9 and 12 is exhausted to a point where pressure differences become ineffective. This equalizing action aids in overcoming any drawing back tendency through the tube 8 from the absorbing mechanism. The clean-out plugs in the bottom block 18 are provided to allow for cleaning out of the device, and the plug 14 in the top block 16 permits re-filling of the central cylinder 11 with the control liquid.

Variations may be made in the invention without departing from the scope thereof, the foregoing being merely a description of a preferred embodiment. For instance, the volumes and diameters of the various parts may be changed to alter the capacity or sensitivity of the mechanism. Furthermore, heavier liquids such as oil, or even mercury, may be used in the cylinder 11, depending upon the chemical activity of the gas used. Where the device is used in conjunction with chlorine dispensing and utilizing apparatus for comparatively low pressure chlorine supplies, water will serve adequately as a control liquid. Where the apparatus is used in conjunction with ammonia, water may be unsatisfactory, due to the high rate of absorption of ammonia in water, wherefore, non-reactive oils may be used. Finally, if it is necessary to have high pressures on the supply side of the "bubbler" mechanism, it may be necessary to employ a relatively heavy liquid in order to secure greater hydraulic back pressure effects for correspondingly smaller differences between level B and level C. If it is undesirable, on the other hand, to use such a heavier liquid, the same result may be achieved by increasing the length of the cylinder 11 and similarly the length of the "bubbler" 34, so that greater differentials in level between level B and level C may be obtained.

Changes may be made in the form, construction and arrangement of the parts without departing from the spirit of the invention or sacrificing any of its advantages, and the right is hereby reserved to make all such changes as fairly fall within the scope of the following claims.

What is claimed as new and desired to be secured by Letters Patent is:

1. A gas metering apparatus comprising an intake chamber and a plurality of downwardly extending vertical tubes communicating therewith, the respective openings into said vertical tubes all being substantially the same distance from the top of the intake chamber, one of said tubes being substantially small in diameter and being bent upwardly, said upwardly bent tube terminating at a point substantially below the opening from the intake chamber into said tube, another of said tubes being of relatively large diameter and having an opened mouth in its lower end opening downwardly, said mouth being located at a distance substantially below the upward bend of the first named tube.

2. A gas metering apparatus comprising an outer chamber and an inner chamber, said inner chamber having downwardly extending vertical tubes and being substantially enclosed within the outer chamber, said inner chamber opening downwardly into said downwardly extending vertical tubes, said tubes being open at their extremities, said openings being the only openings whereby communication is allowed between the outer chamber and the inner chamber, one of said tubes being of relatively small diameter, said one tube being bent upwardly to form a U-tube, one of said openings of said U-tube communicating with the outer chamber and being located at a distance below the point at which the inner chamber opens into the U-tube, another of said downwardly extending vertical tubes being of relatively large diameter and having an opened mouth at its lower extremity through which mouth communication between the inner chamber and the outer chamber may take place, said last named mouth being located at a point substantially below the bend in the U-tube.

3. A gas metering apparatus comprising an outer chamber and an inner chamber, said inner chamber having downwardly extending vertical tubes and being substantially enclosed within the outer chamber, said inner chamber opening downwardly into said downwardly extending vertical tubes, said tubes being open at their extremities, said openings being the only openings whereby communication is allowed between the outer chamber and the inner chamber, one of said tubes being of relatively small diameter, said one tube being bent upwardly to form a U-tube, one of said openings of said U-tube communicating with the outer chamber and being located at a distance below the point at which the inner chamber opens into the U-tube, another of said downwardly extending vertical tubes being of relatively large diameter and having an opened mouth at its lower extremity through which mouth communication between the inner chamber and the outer chamber may take place, said last named mouth being located at a point substantially below the bend in the U-tube, said outer chamber containing a liquid, said liquid maintaining a normal level both inside and outside of the inner chamber, said level being substantially above the point at which the inner chamber opens into the downwardly extending tubes.

4. A gas metering apparatus comprising an outer chamber and an inner chamber, said inner chamber having downwardly extending vertical tubes and being substantially enclosed within the outer chamber, said inner chamber opening downwardly into said downwardly extending vertical tubes, said tubes being open at their extremities, said openings being the only openings whereby communication is allowed between the outer chamber and the inner chamber, one of said tubes being of relatively small diameter, said one tube being bent upwardly to form a U-tube, one of said openings of said U-tube communicating with the outer chamber and being located at a distance below the point at which the inner chamber opens into the U-tube, another of said downwardly extending vertical tubes being of relatively large diameter and having an opened mouth at its lower extremity through which mouth communication between the inner chamber and the outer chamber may take place, said last named mouth being located at a point substantially below the bend in the U-tube, said outer chamber containing a liquid, said liquid maintaining a normal level both inside and outside of the inner chamber, said level being substantially above the point at which the inner chamber opens into the downwardly extending tubes, said inner chamber taken together with its tubes having a volume substantially greater than the volume of liquid contained within the apparatus.

5. A gas metering device comprising a reservoir, said reservoir being partially filled with liquid, means forming a gas-tight chamber within said reservoir partially immersed in said liquid, conduit means disposed below the liquid level forming communication between said chamber and said reservoir whereby liquid normally fills said chamber to the normal liquid level within the reservoir, said conduit means comprising a plurality of tubes opening into said chamber at the same level, one of said tubes being substantially straight and projecting downwardly from the chamber into the reservoir, another of said tubes being a U-tube and having its bent portion at a level above the reservoir end of said straight tube, and its reservoir communicating end disposed at a lower level than its chamber communicating end, a gas conduit communicating with said reservoir above said liquid level, and a gas conduit communicating with said chamber above said liquid level.

6. A reversible operating gas metering device comprising an outer chamber and an inner chamber, said outer chamber communicating to the point of delivery from the meter, the inner chamber communicating directly to the point of gas supply, said inner chamber having two vertical tubes extending downwardly from the lower portion thereof, one of said tubes being of relatively larger diameter and the other of said tubes being a capillary tube, said capillary tube being bent upwardly to form a U-tube, the U-bend of said tube being located above the mouth of the tube of larger diameter, the external mouth of said U-tube being located below the internal mouth of said U-tube, liquid enclosed within said outer chamber and extending upwardly into said chamber to a level substantially above the external opening of the U-tube of the inner chamber.

7. A gas metering apparatus comprising an intake chamber, a gas supply conduit leading to the supply chamber adjacent the top thereof, an outer chamber surrounding said intake chamber and having a body of liquid therein, a plurality of downwardly extending tubes connecting with said intake chamber, said tubes opening into the interior of said intake chamber at a point substantially removed from the top thereof, one of said tubes having a relatively constricted passage, said tube being bent upwardly and having a mouth communicating with the outer chamber, another of said tubes being of relatively large diameter and having an open mouth adjacent its lower end, said mouth being located at a distance below the upward bend of said first named tube, the liquid in the outer chamber being of a height sufficient to normally immerse the mouth portions of said tubes, the volume of said intake chamber above said tubes being sufficient with respect to the volume of liquid in the outer chamber to accommodate all of the liquid which can be forced out of the outer chamber into the intake chamber by a relatively high pressure in the outer chamber without passing liquid through said supply conduit whereby to permit reverse operation of the metering device for metering purposes, and to prevent the said liquid from passing through said supply conduit.

8. A gas metering device comprising a reservoir, said reservoir being partially filled with liquid, means forming a gas-tight chamber within said reservoir partially immersed in said liquid, conduit means disposed below the liquid level forming communication between said chamber and said reservoir whereby liquid normally fills said chamber to the normal liquid level within the reservoir, said conduit means comprising a plurality of tubes opening into said chamber adjacent the bottom thereof, one of said tubes being substantially straight and projecting downwardly from the chamber into the reservoir, another of said tubes being a U-tube and having its bent portion at a level above the reservoir end of said straight tube, and its reservoir communicating end disposed at a substantial distance above the bent portion, a gas conduit communicating with said reservoir above said liquid level, and a gas supply conduit communicating with said chamber above said liquid level, said chamber being of sufficient volume capacity above said normal liquid level with respect to the volume of said reservoir to accommodate all of the liquid which can be forced from the reservoir into the said chamber by a relatively high reverse pressure in the reservoir whereby to permit reverse operation of the metering device and to prevent said liquid from being regurgitated through said gas supply conduit.

ROY BLAIR EVERSON.